(12) United States Patent
Lin et al.

(10) Patent No.: US 7,136,355 B2
(45) Date of Patent: Nov. 14, 2006

(54) TRANSMISSION COMPONENTS FOR PROCESSING VLAN TAG AND PRIORITY PACKETS SUPPORTED BY USING SINGLE CHIP'S BUFFER STRUCTURE

(75) Inventors: Ying-Chien Lin, Hsinchu (TW); Jui-Yu Wu, Hsinchu (TW)

(73) Assignee: ADMtek Incorporated, Hsinchu (TW)

( * ) Notice: Subject to any disclaimer, the term of this patent is extended or adjusted under 35 U.S.C. 154(b) by 404 days.

(21) Appl. No.: 09/760,596

(22) Filed: Jan. 16, 2001

(65) Prior Publication Data

US 2004/0213243 A1    Oct. 28, 2004

(51) Int. Cl.
*H04L 12/56* (2006.01)
(52) U.S. Cl. ............. 370/235; 370/412; 370/468
(58) Field of Classification Search .......... 370/235, 370/412, 428–429, 463, 468–469, 230–238; 710/40; 709/249
See application file for complete search history.

(56) References Cited

U.S. PATENT DOCUMENTS

| | | | | |
|---|---|---|---|---|
| 6,128,666 A | * | 10/2000 | Muller et al. | 709/238 |
| 6,335,935 B1 | * | 1/2002 | Kadambi et al. | 370/396 |
| 6,493,318 B1 | * | 12/2002 | Bare | 370/238 |

* cited by examiner

*Primary Examiner*—Ricky Q. Ngo
*Assistant Examiner*—Richard Cahng
(74) *Attorney, Agent, or Firm*—Dickinson Wright PLLC

(57) ABSTRACT

A transmission component for processing priority packets supported by using a single chip's buffer structure. Packets of network data are divided into high priority packets and low priority packets. High priority packets in the component are sent first, followed by low priority packets in order to satisfy priority requirement. Moreover, packets are transmitted continuously without stopping to maintain packet transmission at high performance. Furthermore, the transmission component of the present invention is compatible with different kinds of chip structure, and therefore no hardware must be changed when applied to different kinds of chip structure.

12 Claims, 8 Drawing Sheets

|  | 4 bytes | 4 bytes | 4 bytes | 4 bytes |
|---|---|---|---|---|
| Descriptor 1 | TDES 0 | TDES 1 | TDES 2 | TDES 3 |
|  |  |  |  |  |
|  | VLANtag | VLANtag address |  |  |
| Descriptor 2 | TDES 0 | TDES 1 | TDES 2 | TDES 3 |
|  |  |  |  |  |
|  | VLANtag | VLANtag address |  |  |

FIG. 2

TRANSMISSION COMPONENTS FOR PROCESSING VLAN TAG AND PRIORITY PACKETS SUPPORTED BY USING SINGLE CHIP'S BUFFER STRUCTURE

FIELD OF THE INVENTION

The present invention relates to a network packet being processed on a general computer system. More particularly, it relates to a personal computer that is connected to a communications network, and has a transmission software component for handling packets of network data.

BACKGROUND OF THE INVENTION

The effectiveness of general purpose stand alone computers, such as the personal computer found in most office environments and the laptop computers increasingly used by professionals requiring portability, has been substantially improved by allowing communications between machines over a communications network. Such a network of computers allows the resources of one computer to be shared with other computers in the network. For example, storage areas that have files, printers, modems, and other resources may all be advantageously shared.

The data that is shared between computers is sent in packets across the physical network connection and read by destination computers. Such packetized network data may be requests for shared resources, data, such as a file, or other information that must be communicated from one computer to the other. As used herein, the term "network data" refers to data or information that is actually transmitted over the communications network between different computers.

On a particular computer or node of the network, a network interface card (NIC) or network card monitors the physical communications channel for packets destined for that computer, and transmits packets of network data destined for other computers. Software components run on the node computer under direction or control of the operating system or the structures for managing and controlling the network card operations. Furthermore, other software components exist to further abstract the network communications channel and provide more and more general networking interfaces for higher layers using their services. The layered approach allows compartmentalization and easier development of network applications. One model used to provide a structure for layered software component development is the seven-layer ISO model that is well known in the art. While actual implementations of the ISO model do not necessarily rigidly isolate each particular layer as a separate component exposing its own interface to layers above and below, the concepts of the model are generally applicable. The lower layers of the ISO model are the data link layer implemented by a network card device driver, and the transport and network layers implemented as a transport protocol driver layer.

Lower level networking functions, such as controlling a network card and the initial processing of packetized network data, are handled by special system software components called drivers. Drivers integrate with a host operating system according to a specific architecture and have special privileges for accessing system resources. Reference will be made to the Windows NT® or Windows 98® operating system available from the Mircrosoft Corporation.

Because there are different types of transport protocols developed over time by different entities for different reasons, there may be different types of transport protocol drivers acting as software components running on a single host computer system in order to provide the necessary networking capabilities for a given installation. Some common transport protocols include TCP/IP, IPX, AppleTalk®, and others. Each transport protocol driver will communicate with one or more individual network card device drivers in order to send network data over a communications network and to receive incoming packets from the communications network.

Furthermore, because there are a multitude of network cards provided by numerous manufacturers, there is a corresponding large number of potential network card device drivers for different chip structures, such as DC21140, DC21142, DC21143, etc., all of different network cards. In order to support full connectivity to the transport protocol drivers, each network card device driver must support the ability to communicate with each different type of transport protocol driver.

In addition, there are many instances where information between a transport protocol driver and a network card device driver may have to be communicated in order to properly process the network data either prior to transmitting the data over the network or after receiving the data from the network. A general method for transmitting or receiving the data will prepare two queue channels for this issue. Then the driver will place the packet into the proper queue channel. For example, a higher priority packet will be sent out in the higher priority queue channel. Likewise, a lower priority packet will be sent out in the lower priority queue channel. Therefore at least two hardware First-in-First-out (FIFO) queue channels must be provided for communicating network data.

What is needed and what would be an advancement in the art would be a process that allows user defined data related to the processing of packetized network data to be efficiently, communicated with an advanced computability through the transmission component.

SUMMARY OF THE INVENTION

Therefore, the present invention provides a transmission component of on which a priority packet is supported by using a single chip's buffer structure. The transmission component of the present invention sends the high priority packets in front of low priority packets to make the priority requirements. Moreover, the packets are transmitted continuously without stopping to maintain packet transmission at a level of high performance. Furthermore, the transmission component of the present invention is compatible with different kinds of chip structure. Therefore, the transmission component of the present invention can be applied to different kinds of chip structure, and no hardware must be changed.

The present invention provides a transmission component for processing priority packets supported by using a single chip's buffer structure between a transport protocol layer and a device layer of the network interface card, comprising: a transmitting part that transmits at least one packet of network data from the transport protocol layer to the device layer of network interface card, and a receiving part that receives at least one packet of network data from the device layer of network interface card. Wherein, the transmitting part comprises a priority checker that gets at least one packet of network data from the transport protocol layer and checks the priority value of the packet of network data; a high priority queue that allows the packet of network data having high priority value from the priority checker to pass through; a low priority queue allowing the packet of network data having a low priority value from the priority checker to pass through; a priority controller that controls the sending rate of the packet of network data having high priority and low priority values; a tag insert structure that inserts a tag into the packet of network data having priority value; and active transmit list that transmits the packet of network data taken from the tag insert structure to the device layer of network interface card. The receiving part comprises a receive active list that receives the packet of network data taken from the device layer of network interface card, and a tag remove structure that receives the packet of network data from the receive active list and removes the tag of the packet of network data having priority value.

The present invention also provides a method for transmitting a packet of network data from a transport protocol layer to a device layer of a network interface card, comprising the step of: getting a packet from the transport protocol layer; getting a priority value of the packet and then dispatching the packet into a high priority queue or a low priority queue according to the priority value of the packet; inserting a tag into the packet having high priority value; and sending the packet having high priority value and low priority value at a rate of N:1 to the device layer of network interface card.

The present invention also provides a method for receiving a packet of network data from a device layer of network interface card to a transport protocol layer, comprising the steps of: getting a packet from the device layer of network interface card; removing a tag from the packet having high priority value; sending the packet to the transport protocol layer, and indicating the priority value of the packet to the transport protocol layer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a block diagram illustrating a packet descriptor structure according to one embodiment of the present invention;

DETAILED DESCRIPTION OF THE PREFERRED EMBODIMENT

Figure 1:
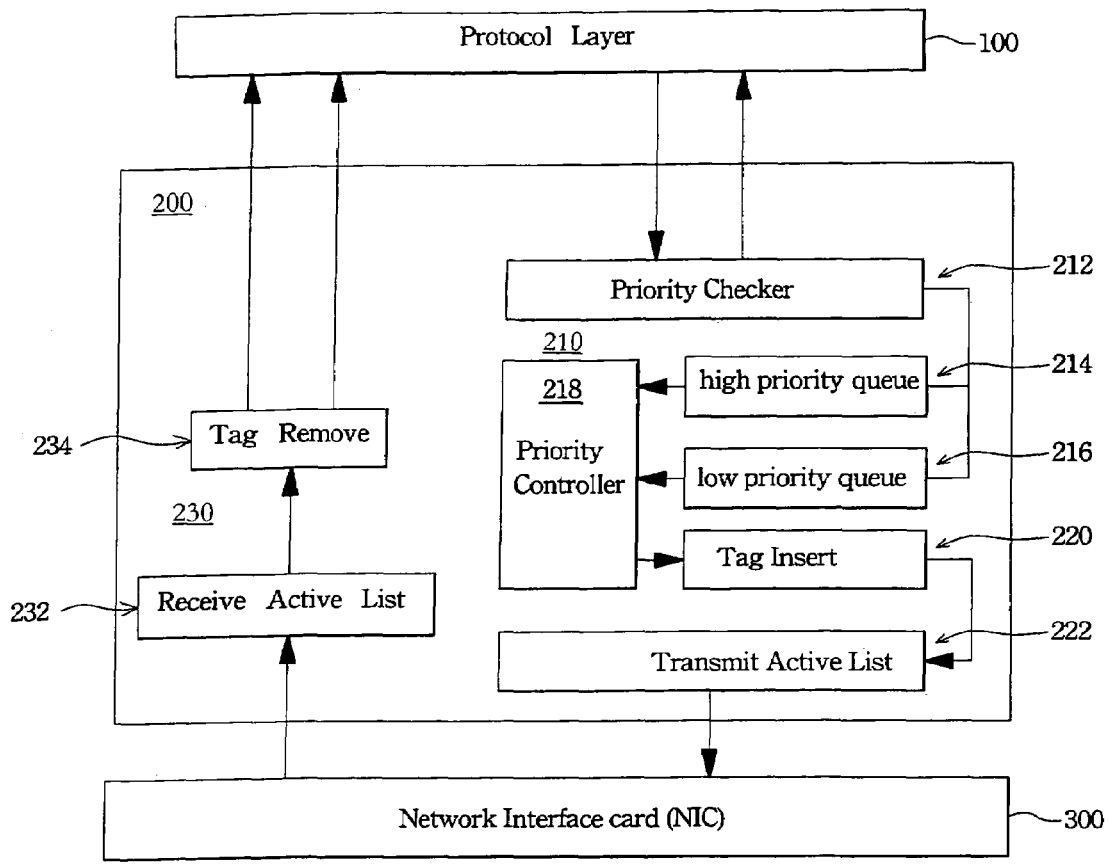
FIG. 1 is a block diagram showing the environment and interfacing of network interface card and transport protocol layer according to one preferred embodiment of the present invention.

Referring to FIG. 1, it is a block diagram showing the environment and interfacing of the network interface card (NIC) and the transport protocol layer according to one preferred embodiment of the present invention. The transmission software component 200 according to the present invention is located between the transport protocol layer 100 and the NIC device driver 300 to transmit network packets and allow the stand lone computer to communicate with other computers in the network. The transmission component 200 is composed of several software components. The software components in the transmission component 200 can be simply divided into two parts where one is for transmitting network packets and the other is for receiving. The software components in the transmitting part 210 comprise a priority checker 212, a high priority queue 214, a low priority queue 216, a priority controller 218, a tag insert 220, and a transmit active list 222. The software components in the receiving part 230 comprise a receive active list 232 and a tag remover 234. The priority checker 212 in the transmitting part 210 must ask the priority of the packet from the protocol layer 100, and decide which packet should be sent into the high priority queue 214 and which packet should be sent into the low priority queue 216. The priority controller 218 must decide when however many packets of which priority from the high and low priority queues 214, 216 should be moved into the transmit active list 222. However, in the real implement, you will never know when the protocol layer 100 will send packets to drivers. So priority controller must be separated into two procedures, send packet procedure and interrupt service routine (ISR). In these two points, the amount of packets stayed in transmit active list 222 is adjusted without jam-up. For the performance consideration, the priority controller 218 must make sure the packets are being processed continuously.

Referring to FIG. 2, it is a schematic block diagram illustrating a packet of data structure in a direct memory access (DMA) descriptor. We will define the descriptor for each packet first. For the purpose of inserting a virtual local area network (VLAN) tag into each packet, a DMA descriptor having skip length with 32 bytes is defined and used. In lastest 16 bytes field of DMA descriptor, the content of first 4 bytes is VLAN tag, and the content of second 4 bytes is the physical address of VLAN tag, wherein the VLAN tag address will be assigned in network interface card (NIC) initialization time.

Figure 3:
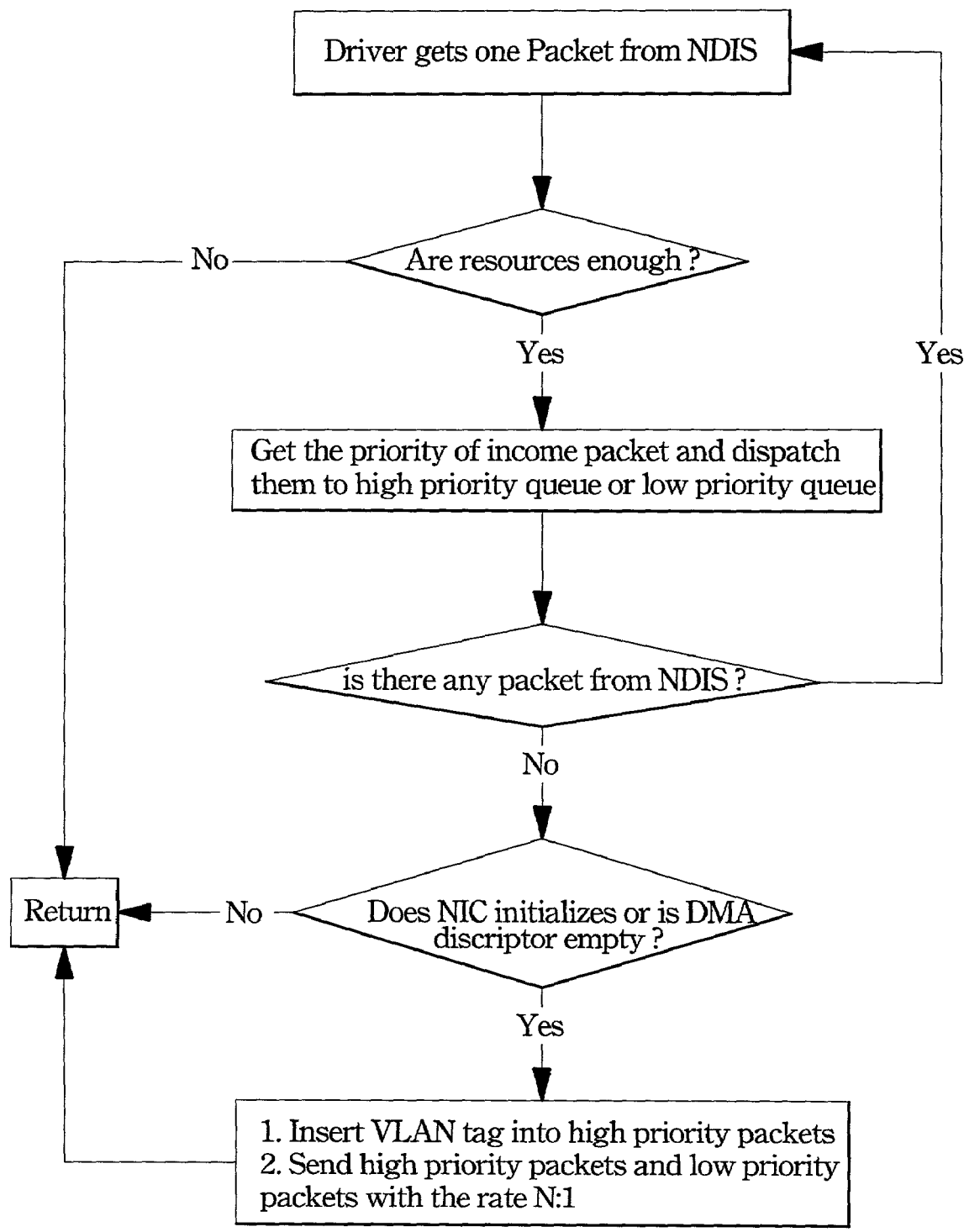
FIG. 3 is a flow chart showing how to transmit data packets from the transport protocol layer and proceed to the network interface card.

The present invention will disclose the method of transmitting a network packet from the transport protocol layer to NIC in the following description. Referring to FIG. 3, it is a flow chart showing how to transmit data from the transport protocol layer and process the data on the network interface card. One technology used herein for integrating network card device drivers to transport protocol drivers is the Network Driver Interface Specification (NDIS) technology implemented on the Windows NT or Windows 98 operating system as the NDIS wrapper device driver. The NDIS technology manages all interaction with system level services and hardware.

Referring to FIGS. 1 and 3, the transmitting part 210 of transmission component 200 will process packets received from NDIS and dispatch them into suitable queues in a sent packet procedure. First, the driver in the transmitting part 210 gets one packet from NDIS. The driver will consider dispatching the packet into suitable queue according to whether the resources are adequate. If the resources are adequate, the driver will get the priority value of each incoming packet by using the NDIS function, NDIS_PER_PACKET_INFO_FROM_PACKET. If the priority value of the packets is high, such as about from 4 to 7, the driver will dispatch packets into high priority queue 214, otherwise the driver will dispatch low priority packets having low priority value, such as about 0 to 3, into low priority queue 216. Then, any packet from NDIS is considered, if yes, the driver gets one packet from NDIS again, if no, next step continues. Considering whether NIC is initialized or the DMA descriptor is empty, packets in high and low priority queues 214, 216 will be sent into transmit active list. Before sending packets into NIC descriptors, VLAN tags are inserted into high priority packets. For the purpose of inserting a VLAN tag into each packet, as the above description defined, we define more descriptor skip length with 32 bytes.

In the lastest 16 bytes field, the content of first 4 bytes is VLAN tag and the content of second 4 bytes is the physical address of VLAN tag. If packets have no priority value, the driver will take action as usual to directly put packets into transmit active list. If the packet has priority value, the driver will divide the first buffer into two portions. The first portion is 12 bytes length. The first descriptor will point to the first portion of the first buffer and VLAN tag filed. The remaining portion of the first buffer will be pointed by the next descriptor after the VLAN tag has been inserted into the first buffer. This packet with priority value in the first buffer will be then transmitted over the network wire. While NIC is initialized or all packets in the descriptors are sent out, the driver should put some packets into NIC descriptors. Wherein, high priority packets and low priority packets will be sent out with a normal rate N:1, such as 5:1. However, if high priority packets or low priority packets are not enough, the driver will keep sending M packets out, but modify the sending rate. In this condition, the quantified rate of high and low priority packets may be M:0, M−1:1, M−2:2, M−3:3, . . . , 1:M−1, or 0:M.

In the following description, the present invention will describe the procedure of processing packets of which one priority value or no priority value needs to be inserted, and will describe a skill about inserting VLAN tag assigned the priority value into outgoing packet.

Figure 4:
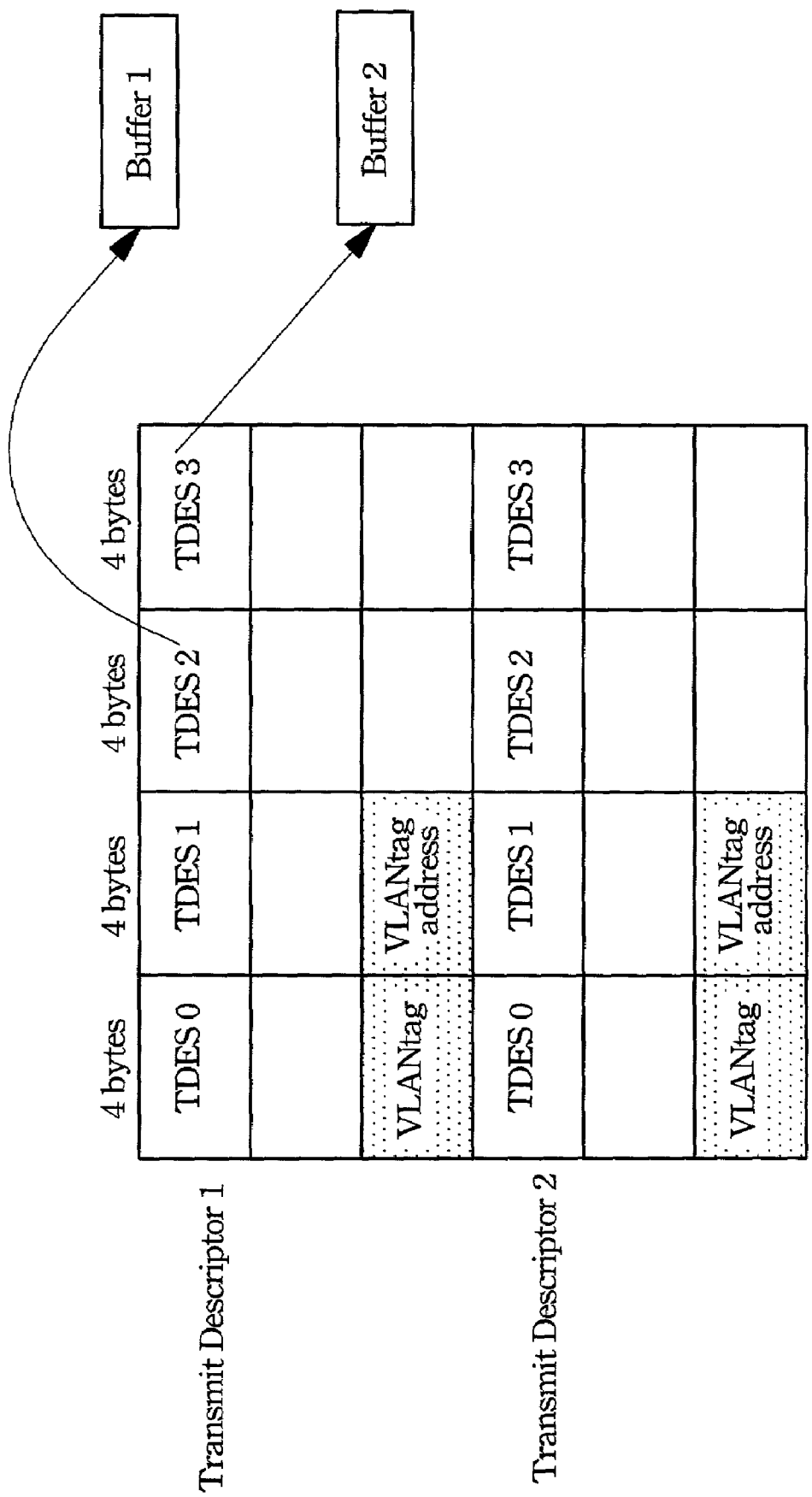
FIG. 4 is a block diagram illustrating transmission of one outgoing packet while no priority value needs to be inserted.

Referring to FIG. 4, if the packet has no priority value, the transmit descriptor descrition 2 (TDES2) of the first descriptor should be pointed to the first buffer, and TDES3 of the first descriptor should be pointed to the second buffer. Therefore, the driver now acts as usual like other drivers in a common network environment.

Figure 5:
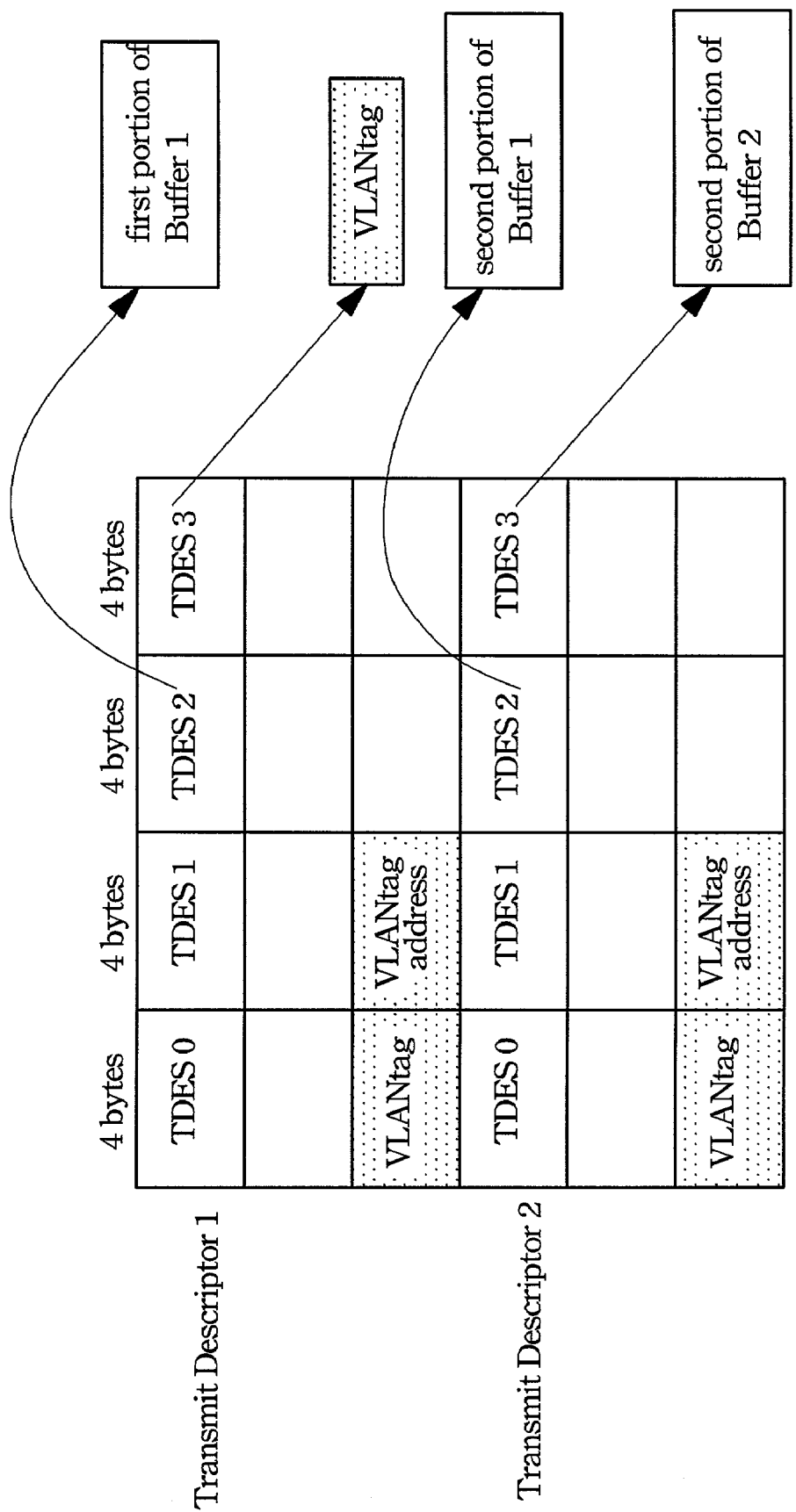
FIG. 5 is a block diagram illustrating packet transmission and the tag insert skill for inserting a VLAN tag into one outgoing packet while priority value needs to be inserted.

Referring to FIG. 5, if the packet has one priority value, the driver will divide the first buffer into two portions. The first portion of the first buffer is 12 bytes in length, and the second portion has the remaining length of the first buffer. The TDES2 of the first descriptor is pointed to the first portion of the first buffer, and TDES3 of the first descriptor is changed to point to VLAN tag filed, and then, TDES2 of the second descriptor is changed to point to the second buffer. Other buffers of this packet will be pointed by the other descriptors.

When the packet is sent in the method of the present invention, it is important to achieve the goal of Quality of Service (QoS). Therefore, a procedure of the interrupt service routine (ISR) is employed. The method of processing queued packets in high priority queue and low priority queue in ISR will be described in the following way. Previously, we had queued many packets. While the driver processes the queued packets, high priority packets will be processed first. The normal sending rate of a high priority packet and a low priority packet is N:1.

Figure 6:
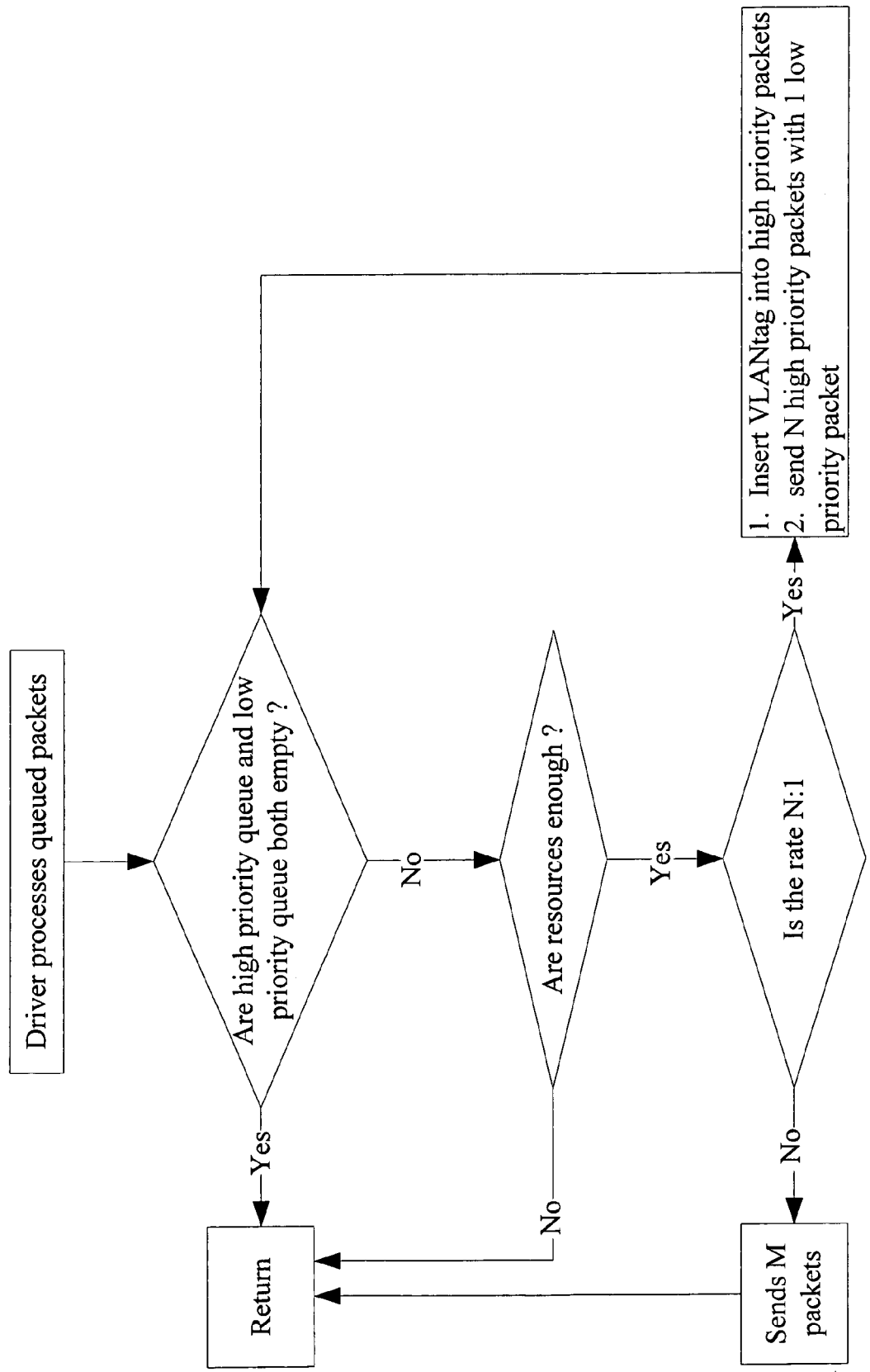
FIG. 6 is a flow chart showing how to process queued packets in high priority queue and low priority queue in ISR.

Referring to FIG. 6, the driver processes the queued packets first. Whether the high priority queue and the low priority queue are both empty is then considered. If the high priority queue and the low priority queue are both empty, whether the resources are enough is then considered. If the resources are enough, then we consider whether the sending rate of the high priority packet and low priority packet can be N:1. If the sending rate is N:1, VLAN tags are then inserted into the high priority packets, and N high priority packets are sent with 1 low priority packet. The process flow is then turned back to consider whether the high priority queue and low priority queue are both empty, in order to continue the process. If the sending rate is not N:1, the driver still sends M packets out, such as 6 packets. In this condition, the quantify rate of high priority packets and low priority packets can be M:0, M−1:1, M−2:2, M−3:3, . . . , 1:M−1 or 0:M. This method will allow the NIC to remain busy in order to enhance the performance.

Figure 7:
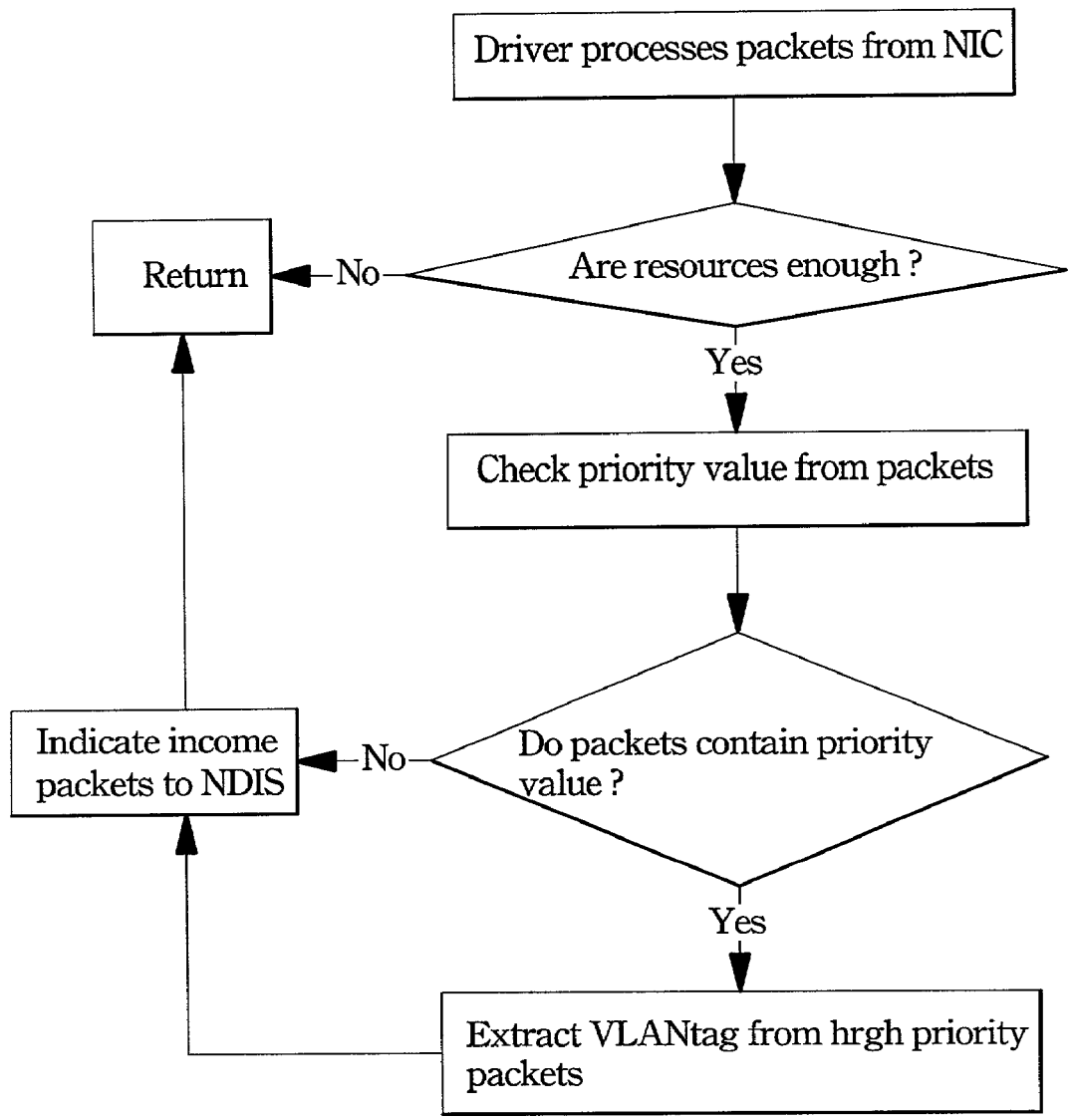
FIG. 7 is a flow chart showing how to receive a data packet from the network interface card and proceed to the transport protocol layer.

The present invention will disclose the method of receiving network packets from the NIC to the transport protocol layer in the following description. Referring to FIG. 7, it is a flow chart showing how to receive data from the NIC 300 and process the data in the transport protocol layer 100. Referring to FIGS. 1 and 7 at the same time, the receiving part 230 of the transmission component 200 will process packet received from NIC 300 and check their priority. First, the driver in the receiving part 230 gets packets from NIC 300. The driver will consider whether the resources are adequate. If the resources are adequate, the driver will check the priority value from packets by verifying if any VLAN tag existed in the first 16 bytes. VLAN tag is actually resident in the field from byte 12 to byte 15 of every incoming packet. If a VLAN tag existed in this packet, the driver will shift the first 12 bytes (including destination address and source address) to right for 4 bytes of length and override the position of the VLAN tag field. Finally, we use the specific NDIS function, NDIS_PER_PACKET_INFO_FROM_PACKET, again to indicate or tell NDIS the priority value of incoming packet.

Figure 8:
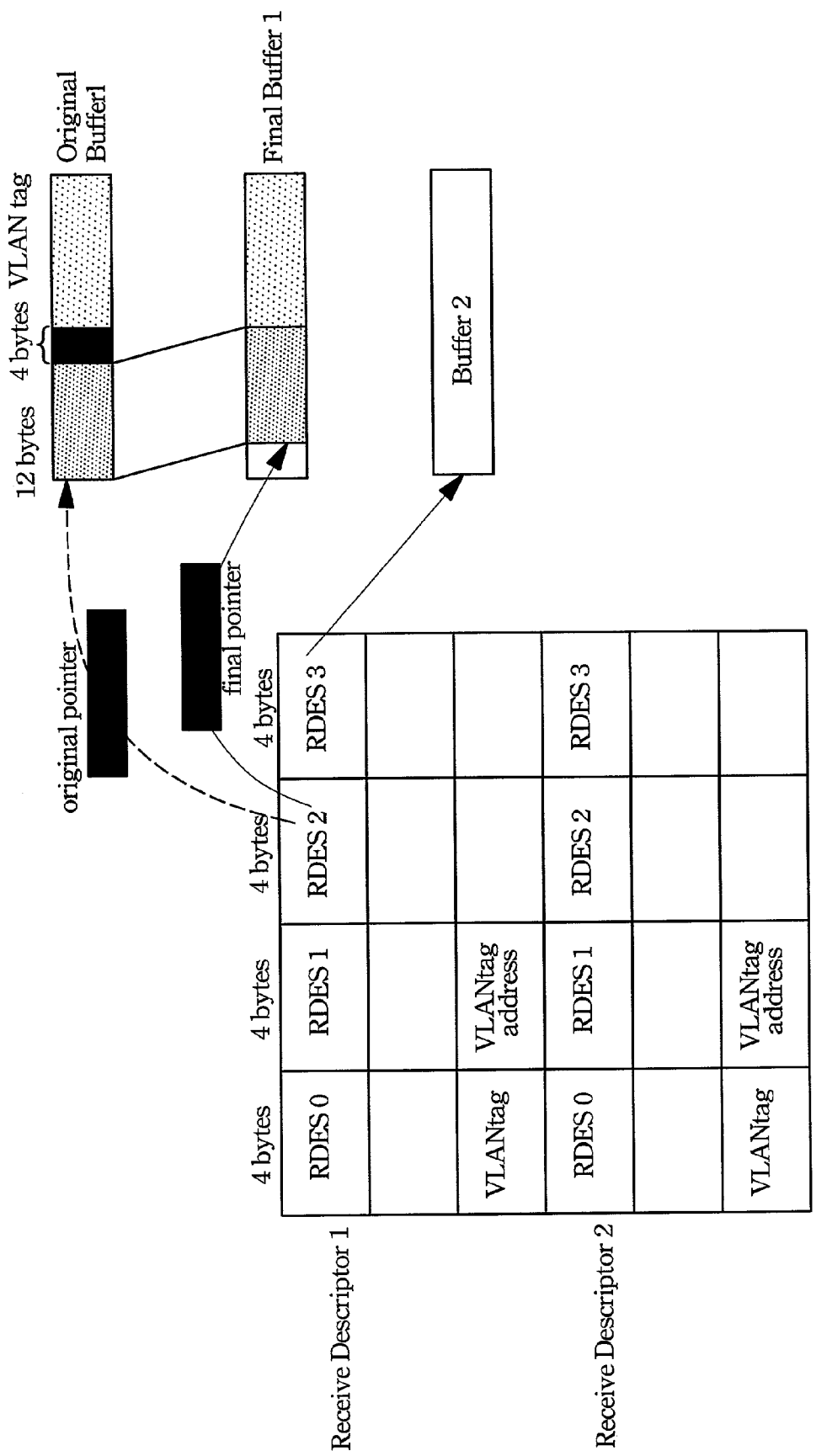
FIG. 8 is a block diagram illustrating tag remove skill.

In the following description, the present invention will describe a skill for removing a VLAN tag assigned to the priority value. Referring to FIG. 8, while the driver identifies that there is a VLAN tag existing in the original first buffer, the driver will shift the first 12 bytes to right and override the VLAN tag field, the shift value is about 4 bytes. Then, the driver reassigns the TDES2 to point to the final first buffer (the first buffer had been modified). Consequently, one upward packet is completed. The driver of the present invention uses the NDIS_PER_PACKET_INFO_FROM_PACKET function (one of the NDIS function) to record a priority value in every packet structure. The NDIS can process the packet according to each priority value after the driver makes the indication. We use this skill to omit the VLAN tag.

According to the above description, the present invention provides a transmission component of which priority packet is supported by using a single chip's buffer structure. The present invention sends the high priority packets first followed by low priority packets to makes real priority requirement. Moreover, the packets are transmitted continuously without stopping to maintain packet transmission at a high level of performance. Furthermore, the transmission component of the present invention is compatible with different kinds of chip structure. Therefore the transmission component of the present invention can be applied to different kinds of chip structure and no hardware must be changed.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A transmission component for processing priority packet supported by using single chip's buffer structure between a transport protocol layer and a device layer of network interface card, comprising:
    a transmitting part that transmits at least one packet of network data from the transport protocol layer to the device layer of network interface card, having:
    a priority checker that gets at least one packet of network data from the transport protocol layer and checks a priority value of the packet of network data;
    a high priority queue that allows the packet of network data having high priority value from the priority checker to pass through;
    a low priority queue allowing the packet of network data having low priority value from the priority checker to pass through;
    a priority controller that controls the sending rate of the packet of network data having high priority value and low priority value;
    a tag insert structure that inserts a tag into the packet of network data having priority value; and
    a transmit active list that transmits the packet of network data got from the tag insert structure to the device layer of network interface card;
    a receiving part that receives at least one packet of network data from the device layer of network interface card, having:
    a receive active list that receives the packet of network data got from the device layer of network interface card; and
    a tag remove structure that receives the packet of network data from the receive active list and removes a tag of the packet of network data having high priority value, wherein the sending rate of the packet of network data having high priority value and low priority value in the priority controller is N:1, and N is any integer value.

2. The transmission component according to claim 1, wherein high priority value is about 4 to 7.

3. The transmission component according to claim 1, wherein low priority value is about 0 to 3.

4. The transmission component according to claim 1, wherein the sending rate of the packet of network data having high priority value and low priority value in the priority controller can be modified to be M:0, M−1:1, M−2:2, M−3:3, . . . , 1:M−1 or 0:M by sending M packets out while there are not enough packets of network data having high priority value or low priority value, and M is of any integer value.

5. A method of transmitting a packet of network data from a transport protocol layer to a device layer of network interface card, comprising the steps of:
    getting a packet from the transport protocol layer;
    getting a priority value of the packet and then dispatching the packet into a high priority queue or a low priority queue according to the priority value of the packet;
    inserting a tag into the packet having high priority value; and
    sending the packet having high priority value and low priority value at a sending rate of N:1 to the device layer of network interface card, wherein N is of any integer value.

6. The method according to claim 5, while the driver transmits a high priority packet, a first buffer of the high priority packet is divided into two portions, and by reassigning the physical addresses to the buffer pointers of DMA descripters at the sequence: a first portion of the first buffer, VLAN tag, a second portion of the first buffer and other buffer of the high priority packet, so that a redundant memory copy is avoided.

7. The method according to claim 6, wherein a VLAN tag and an address of the VLAN tag do not confine to a location in the DMA descripters, the VLAN tag and the address can be declared at another location.

8. The method according to claim 5, wherein high priority value is about 4 to 7.

9. The method according to claim 5, wherein low priority value is about 0 to 3.

10. The method according to claim 5, wherein the sending rate of the packet of network data having high priority value and low priority value can be modified to be M:0, M−1:1, M−2:2, M−3:3, . . . , 1:M−1 or 0:M by sending M packets out while there are not enough packets of network data having high priority value or low priority value to maintain the sending rate N:1, and M and N are of any integer values.

11. A method of receiving a packet of network data from a device layer of network interface card to a transport protocol layer, comprising the steps of:
    getting a packet from the device layer of network interface card;
    removing a tag from the packet having high priority value; and
    sending the packet to the transport protocol layer and indicating the priority value of the packet to the transport protocol layer, wherein, while the driver identifies that there is a VLAN tag existing in a first buffer of incoming packets from a wire, a driver will shift the first M bytes to right and override the VLAN tag field, wherein a shift length is N bytes, and M and N are of any integer values.

12. The method according to claim 11, the value of M is 12, and the value of N is 4.

* * * * *